(12) United States Patent
O'Hara et al.

(10) Patent No.: US 11,383,524 B2
(45) Date of Patent: Jul. 12, 2022

(54) SUPPLY RESERVOIRS WITH ROTARY VALVES

(71) Applicant: Hewlett-Packard Development Company, L.P., Spring, TX (US)

(72) Inventors: Steve A. O'Hara, Vancouver, WA (US); Kenneth Williams, Vancouver, WA (US); David Moeller, Boise, ID (US); Howard G. Wong, Vancouver, WA (US); Ki Jung Han, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/767,343

(22) PCT Filed: Aug. 30, 2018

(86) PCT No.: PCT/US2018/048829
§ 371 (c)(1),
(2) Date: May 27, 2020

(87) PCT Pub. No.: WO2020/046336
PCT Pub. Date: Mar. 5, 2020

(65) Prior Publication Data
US 2020/0398582 A1 Dec. 24, 2020

(51) Int. Cl.
*B41J 2/175* (2006.01)
(52) U.S. Cl.
CPC ....... *B41J 2/17596* (2013.01); *B41J 2/17509* (2013.01); *B41J 2/17566* (2013.01)

(58) Field of Classification Search
CPC . B41J 2/17596; B41J 2/17509; B41J 2/17566
See application file for complete search history.

(56) References Cited

U.S. PATENT DOCUMENTS

| | | | |
|---|---|---|---|
| 6,229,973 B1 | 5/2001 | Wang | |
| 6,889,026 B2 | 5/2005 | Schlageter et al. | |
| 7,543,920 B2 | 6/2009 | Wilson et al. | |
| 9,061,509 B2 | 6/2015 | Shimizu et al. | |
| 9,505,225 B1 | 11/2016 | Tamarez Gomez et al. | |
| 2003/0081969 A1 | 5/2003 | Muramatsu | |
| 2005/0117919 A1* | 6/2005 | Ito | G03G 15/0862 399/27 |
| 2012/0219318 A1 | 8/2012 | Yoshida | |
| 2017/0285529 A1 | 10/2017 | Nishiyama | |

FOREIGN PATENT DOCUMENTS

| | | | | |
|---|---|---|---|---|
| CN | 107471644 A | 12/2017 | | |
| EP | 1566706 B1 | 8/2017 | | |
| JP | 09109407 | 4/1997 | | |
| JP | 6311778 B2 | 4/2018 | | |
| WO | WO-2020046321 A1 * | 3/2020 | .......... B41J 2/17523 |

* cited by examiner

*Primary Examiner* — Justin Seo
(74) *Attorney, Agent, or Firm* — Brooks Cameron & Huebsch PLLC

(57) ABSTRACT

In some examples, an apparatus can include a supply reservoir including print substance, and a rotary valve having a central rotary axis, where the central rotary axis is perpendicular to a height of the supply reservoir, where the rotary valve is in a closed position such that the print substance is unable to be supplied from the supply reservoir.

15 Claims, 5 Drawing Sheets

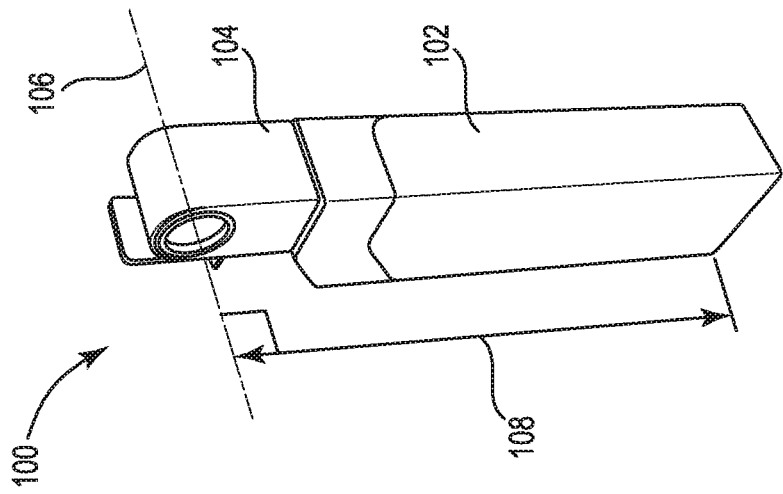
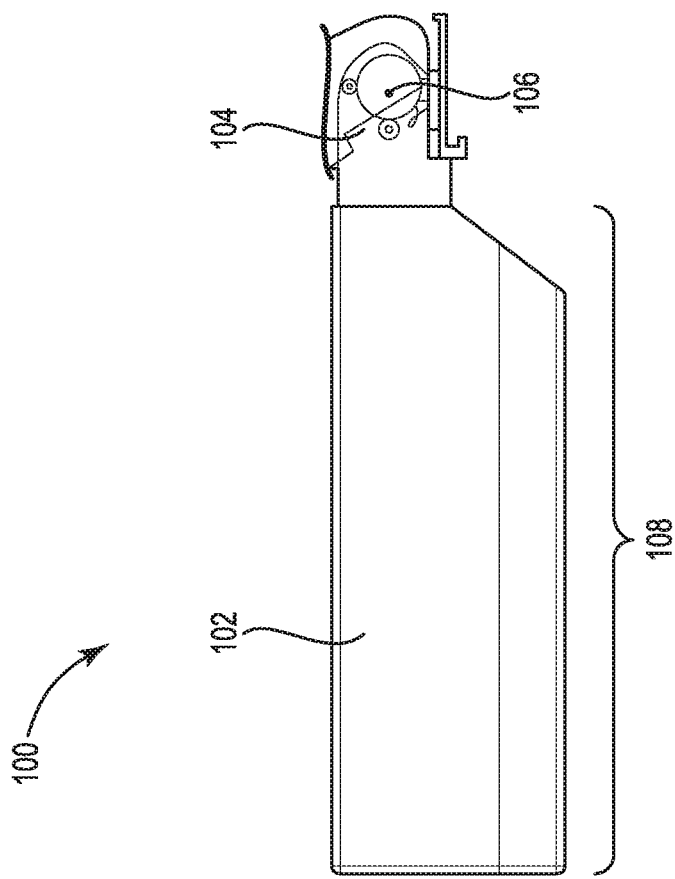

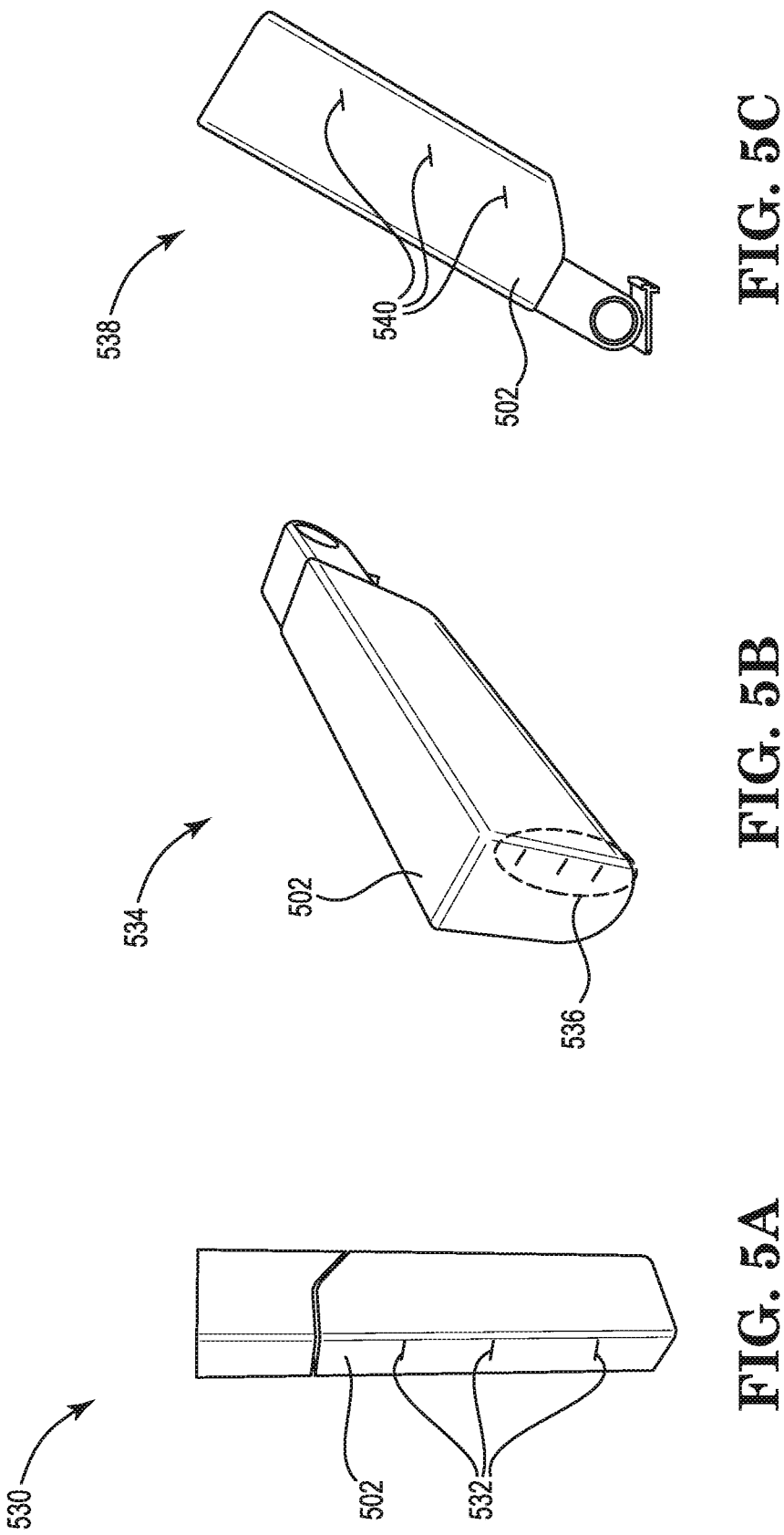

SUPPLY RESERVOIRS WITH ROTARY VALVES

BACKGROUND

Imaging systems, such as printers, copiers, etc., may be used to form markings on a physical medium, such as text, images, etc. In some examples, imaging systems may form markings on the physical medium by performing a print job. A print job can include forming markings such as text and/or images by transferring a print substance (e.g., ink, toner, etc.) to the physical medium.

BRIEF DESCRIPTION OF THE DRAWINGS

FIG. 1A illustrates an example of an apparatus including a rotary valve in a closed position consistent with the disclosure.

FIG. 1B illustrates a perspective view of an example of an apparatus including a rotary valve in a closed position consistent with the disclosure.

FIG. 5A illustrates an example of a print substance supply including a rotary valve in a closed position and a supply reservoir in a first orientation consistent with the disclosure.

FIG. 5B illustrates an example of a print substance supply including a rotary valve in a closed position and a supply reservoir in a second orientation consistent with the disclosure.

FIG. 5C illustrates an example of a print substance supply including a rotary valve in an open position consistent with the disclosure.

DETAILED DESCRIPTION

Figure 2:
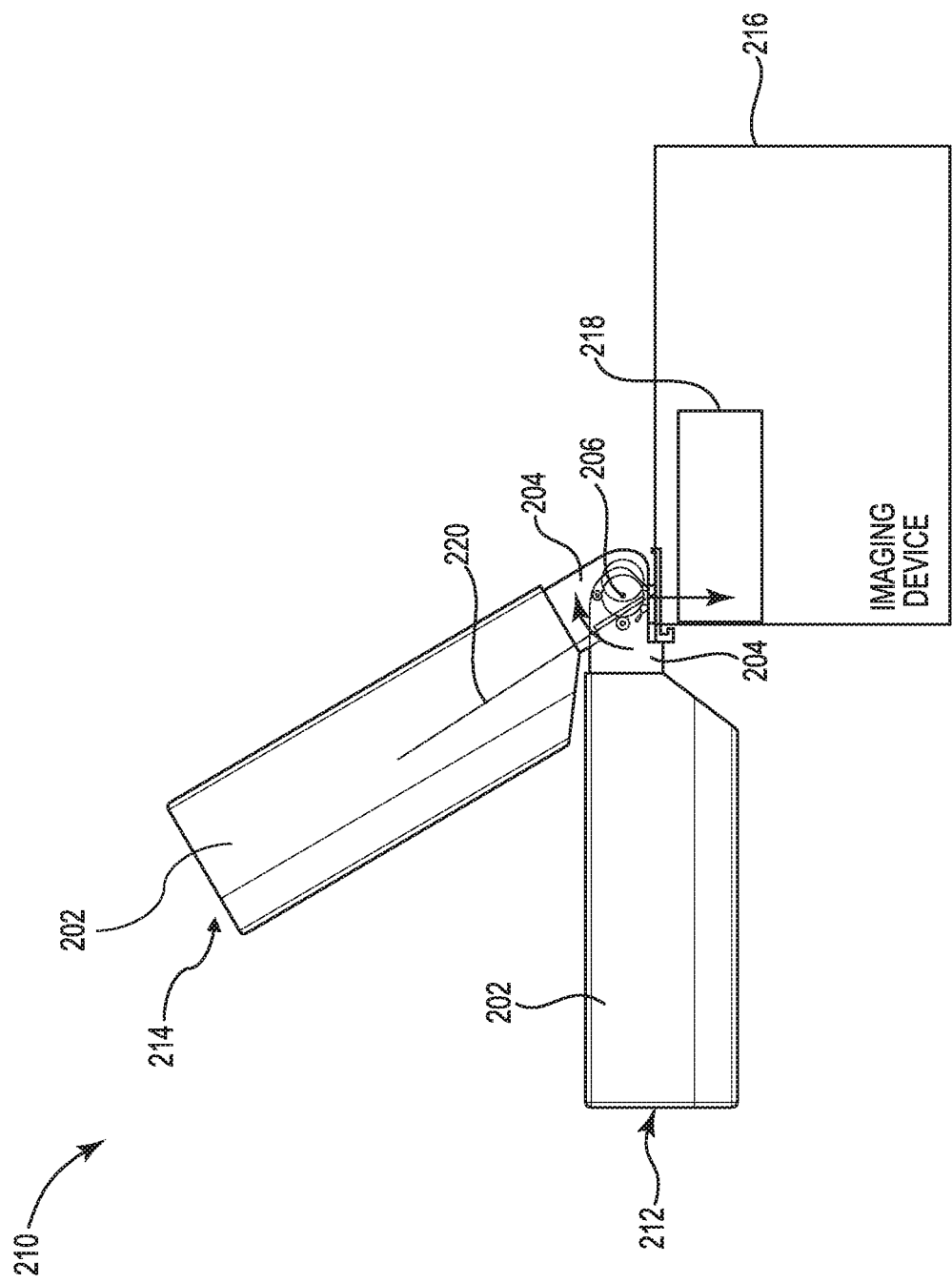
FIG. 2 illustrates an example of an imaging device and a print substance supply with a rotary valve being rotated from a closed position to an open position consistent with the disclosure.

Imaging devices may include a supply of a print substance located in a reservoir. As used herein, the term "print substance" refers to a substance which, when applied to a medium, can form representation(s) (e.g., text, images models, etc.) on the medium during a print job.

The print substance can be deposited onto a physical medium. As used herein, the term "imaging device" refers to any hardware device with functionalities to physically produce representation(s) (e.g., text, images, models, etc.) on the medium. In some examples, a "medium" may include paper, photopolymers, plastics, composite, metal, wood, or the like.

The reservoir including the print substance may be inside of the imaging device and include a supply of the print substance such that the imaging device may draw the print substance from the reservoir as the imaging device creates the images on the print medium. As used herein, the term "reservoir" refers to a container, a tank, and/or a similar vessel to store a supply of the print substance for use by the imaging device.

As the imaging device draws the print substance from the reservoir, the amount of print substance in the reservoir may deplete. As a result, the amount of print substance in the reservoir of the imaging device may have to be replenished.

A print substance supply may be utilized to fill and/or refill the reservoir of the imaging device with print substance. During a fill and/or refill operation, the print substance supply can transfer print substance from the print substance supply to the reservoir of the imaging device. However, space considerations in an imaging device may cause a print substance supply to be inserted and attached to an imaging device in an awkward manner. For example, ensuring the print substance supply is attached to and engaged with the imaging device may be difficult if a user is unable to reach an attachment or locking mechanism due to an access area for the reservoir of the imaging device being in a hard to reach area of the imaging device or the access area is small. Additionally, actuating a supply of the print substance may be difficult due to space considerations and/or other factors.

Accordingly, supply reservoirs with rotary valves can allow for attachment and engagement of a supply reservoir with an imaging device. For example, in an imaging device with space considerations, supply reservoirs with rotary valves can allow for simple attachment/engagement of the supply reservoir with the imaging device. Further, supply reservoirs with rotary valves can allow for easy actuation of a supply of print substance to the reservoir of the imaging device by rotating the supply reservoir and rotary valve.

FIG. 1A illustrates an example of an apparatus 100 including a rotary valve 104 in a closed position consistent with the disclosure. Apparatus 100 can include a supply reservoir 102, rotary valve 104, central rotary axis 106, and height 108 of supply reservoir 102.

As illustrated in FIG. 1A, apparatus 100 can include supply reservoir 102. Supply reservoir 102 can include print substance. Apparatus 100 can be utilized to supply print substance to an imaging device, as is further described herein.

Apparatus 100 can include rotary valve 104. As used herein, the term "valve" refers to a device to control the flow of a liquid, gas, or other material through a channel. As used herein, the term "rotary valve" refers to a valve in which rotation of a channel or channels controls the flow of a liquid, gas, or other material through other attached channels. For example, rotary valve 104 can include channels through which a material (e.g., print substance) can flow. For instance, rotary valve 104 control the flow of print substance from supply reservoir 102 by rotation of a channel or channels within rotary valve 104.

Rotary valve 104 can include central rotary axis 106. As used herein, the term "axis" refers to a line which bisects a body. As used herein, the term "central rotary axis" refers to an axis about which a body rotates. For example, central rotary axis 106 can be an axis about which rotary valve 104 (and consequently, supply reservoir 102) rotates. For example, rotary valve 104 can rotate about central rotary axis 106 in order to control the flow of print substance from supply reservoir 102 by rotation of the channel or channels within rotary valve 104.

Central rotary axis 106 can be perpendicular to height 108 of supply reservoir 102. For example, central rotary axis 106 can be oriented at a right angle relative to the height 108 of supply reservoir 102, as is further described in connection with FIG. 1B.

Rotary valve 104 can be in a closed position such that print substance included in supply reservoir 102 is unable to be supplied from supply reservoir 102. For example, when rotary valve 104 is in the closed position, print substance from the supply reservoir 102 is not able to flow from the supply reservoir 102, through rotary valve 104, and into a reservoir of an imaging device, as is further described herein.

Rotary valve 104 can be normally in the closed position. For example, unless rotary valve 104 is connected to an imaging device, rotary valve 104 can be in the closed position such that print substance does not flow from supply reservoir 102.

Rotary valve 104 can include an elastomeric seal such that a fluid tight seal is provided in the rotary valve 104. As used herein, the term "elastomeric seal" refers to an elastomer material that prevents transfer of material from one side to the other. For example, the elastomeric seal can provide a fluid tight seal at an interface/interfaces within rotary valve 104. The fluid tight seal can prevent print substance from transferring outside of the interface(s) within rotary valve 104.

FIG. 1B illustrates a perspective view of an example of an apparatus 100 including a rotary valve 104 in a closed position consistent with the disclosure. As illustrated in FIG. 1B, apparatus 100 can include supply reservoir 102 and rotary valve 104. Rotary valve 104 can include central rotary axis 106. Supply reservoir 102 can include height 108.

Central rotary axis 106 can be perpendicular to height 108 of supply reservoir 102. For example, central rotary axis 106 can be oriented at a right angle relative to the height 108 of supply reservoir 102. In other words, central rotary axis 106 and the height of supply reservoir 102 are oriented such that they are oriented (or substantially oriented) perpendicular to each other (e.g., at or substantially at a right angle).

As used herein, the term "substantially" intends that the characteristic does not have to be absolute, but is close enough so as to achieve the characteristic. For example, "substantially perpendicular" and "substantially at a right angle" is not limited to absolute perpendicular or at a right angle. For instance, central rotary axis 106 can be within 0.5°, 1°, 2°, 5°, 10°, etc. of absolutely perpendicular relative to height 108.

FIG. 2 illustrates an example of an imaging device 216 and a print substance supply 210 with a rotary valve 204 being rotated from a closed position 212 to an open position 214 consistent with the disclosure. Print substance supply 210 can include supply reservoir 202 and rotary valve 204. Print substance supply 210 is illustrated in FIG. 2 in a closed position 212 and an open position 214. Imaging device 216 can include reservoir 218.

As illustrated in FIG. 2, print substance supply 210 can include supply reservoir 202. Supply reservoir 202 can include print substance. Print substance supply 210 can be utilized to supply print substance to imaging device 216, as is further described herein.

Print substance supply 210 can include rotary valve 204. Rotary valve 204 can include central rotary axis 206. For example, rotary valve 204 (and supply reservoir 202) can rotate about central rotary axis 206 from closed position 212 to open position 214, as is further described herein.

At 212, rotary valve 212 is in a closed position. In closed position 212, supply reservoir 202 is unable to supply print substance to reservoir 218 of imaging device 216.

Print substance supply 210 can include a first locking mechanism. As used herein, the term "locking mechanism" refers to a mechanical fastening device to secure rotary valve 212 to prevent rotary valve 212 from rotation when engaged. The first locking mechanism can be normally engaged to prevent rotary valve 204 from being rotated from closed position 212 to open position 214. For example, unless first locking mechanism is disengaged, rotary valve 204 can not be rotated from closed position 212 to open position 214.

The first locking mechanism can be disengaged in response to rotary valve 204 being attached to imaging device 216. For example, when print substance supply 210 is attached to imaging device 216 (e.g., via rotary valve 204), first locking mechanism can be disengaged. As a result of first locking mechanism being disengaged, rotary valve 204 can be rotated from closed position 212 to open position 214 (e.g., as illustrated in FIG. 2).

Rotary valve 204 can be rotated (e.g., clockwise, as oriented in FIG. 2) from closed position 212 to open position 214. Rotation of rotary valve 204 from closed position 212 to open position 214 can cause print substance to be supplied from supply reservoir 202, through rotary valve 204, to reservoir 218 of imaging device 216.

When rotary valve 204 is at the open position 214, a direct path is provided from supply reservoir 202, through rotary valve 204, to reservoir 218 of imaging device 216. In other words, print substance is able to flow from supply reservoir 202 to reservoir 218 of imaging device 216 without any intervening obstacles.

Print substance can be supplied from supply reservoir 202 to reservoir 218 of imaging device 216 via the open position 214 rotary valve 204. For example, as imaging device 216 draws print substance from reservoir 218, the amount of print substance in the reservoir 218 may deplete during a print job as print substance is applied to a medium to form representation(s) on the medium. Therefore, a fill and/or refill operation (e.g., as described above) may be performed to fill reservoir 218 with print substance. In other words, during a fill and/or refill operation, print substance can be transferred from supply reservoir 202 to reservoir 218 of imaging device 216. For example, supply reservoir 202 can include one liter of print substance and can supply one liter of print substance to reservoir 218 of imaging device 216.

Although supply reservoir 202 is described above as supplying one liter of print substance, examples of the disclosure are not so limited. For example, supply reservoir 202 can supply more than one liter or less than one liter of print substance.

In some examples, reservoir 218 may already be partially filled with print substance. In such an example, during a fill and/or refill operation, supply reservoir 202 can supply print substance to reservoir 218 until reservoir 218 is filled with print substance. In some examples, during a fill and/or refill operation, supply reservoir 202 can supply print substance to reservoir 218 until supply reservoir 202 is depleted of print substance.

During a fill/refill operation, preventing print substance supply 210 from being disturbed can prevent accidental spillage of print substance or damage. For example, preventing print substance supply 210 from being disturbed when rotary valve 204 is in open position 214 can prevent print substance from being spilled outside of reservoir 218 of imaging device 216, prevent damage to imaging device 216, prevent damage to print substance supply 210, etc.

Print substance supply 210 can include a second locking mechanism. The second locking mechanism can engage a surface of imaging device 216 in response to rotary valve 204 being rotated from closed position 212 to open position 214. The second locking mechanism can prevent translational movement of rotary valve 204 when rotary valve 204 is in open position 214.

Figure 3:
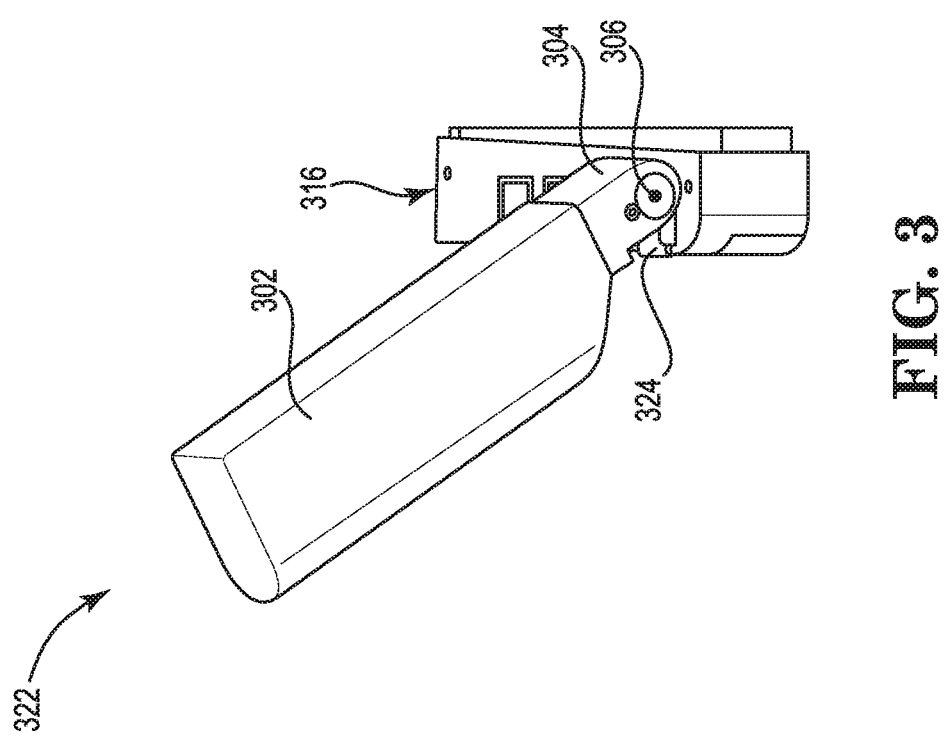
FIG. 3 illustrates an example of a system including a print substance supply having a rotary valve in an open position and an imaging device consistent with the disclosure.

FIG. 3 illustrates an example of a system 322 including a print substance supply having a rotary valve 304 in an open position and an imaging device 316 consistent with the disclosure. The system 322 can include supply reservoir 302, rotary valve 304, central rotary axis 306, imaging device 316, and surface 324 of imaging device 316.

As illustrated in FIG. 3, system 322 can include supply reservoir 302. Supply reservoir 302 can include print substance. Print substance can be supplied to imaging device 316 from supply reservoir 302.

As illustrated in FIG. 3, rotary valve 304 is in an open position. As a result, print substance can be supplied from supply reservoir 302 to imaging device 316 via rotary valve 304.

As previously described in connection with FIG. 2, print substance can be supplied from supply reservoir 302 to a reservoir of imaging device 316 via rotary valve 304 when rotary valve 304 is in the open position. For example, as imaging device 316 performs print jobs, print substance in imaging device 316 can deplete. Therefore, during a fill and/or refill operation, print substance may be supplied to imaging device 316 so that imaging device 316 can continue to perform print jobs.

Print substance can be supplied to a reservoir of imaging device 316 until an amount of print substance in the reservoir of imaging device 316 reaches a predetermined level. For example, a reservoir in imaging device 316 may include a maximum amount of print substance (e.g., two liters). When the maximum amount of print substance in the reservoir in imaging device 316 is reached, transfer of print substance from supply reservoir 302 can be stopped.

As previously described in connection with FIG. 2, rotary valve 304 can include a locking mechanism (e.g., the second locking mechanism, as described in connection with FIG. 2). The locking mechanism can engage surface 324 of imaging device 316 when rotary valve 304 is in the open position (e.g., as illustrated in FIG. 3). For example, the when rotary valve 304 is rotated from the closed position to the open position, the locking mechanism can engage surface 324 of imaging device 316. The locking mechanism engagement with surface 324 of imaging device 316 can prevent translational movement of rotary valve 304 when rotary valve 304 is in the open position.

When a fill and/or refill operation is complete, rotary valve 304 can be rotated (e.g., counter-clockwise, as oriented in FIG. 3) from the open position to the closed position. For example, when the amount of print substance in the reservoir of imaging device 316 reaches the predetermined level, the transfer of print substance from supply reservoir 302 to imaging device 316 can be stopped. As a result, the rotary valve 304 can be rotated from the open position to the closed position.

In response to the rotary valve 304 being rotated from the open position to the closed position, the locking mechanism can disengage from surface 324 of imaging device 316. As a result of the locking mechanism disengaging from surface 324, the rotary valve 304 can be removed from imaging device 316.

Supply reservoirs with rotary valves can be utilized to fill and/or refill a reservoir of an imaging device with print substance. Supply reservoirs with rotary valves can allow for the attachment and engagement of the supply reservoir with an imaging device with space considerations to allow for simple attachment/engagement with a reservoir of an imaging device, and can provide for easy actuation of a supply of print substance to the reservoir of the imaging device by rotating the supply reservoir and rotary valve.

Figure 4:
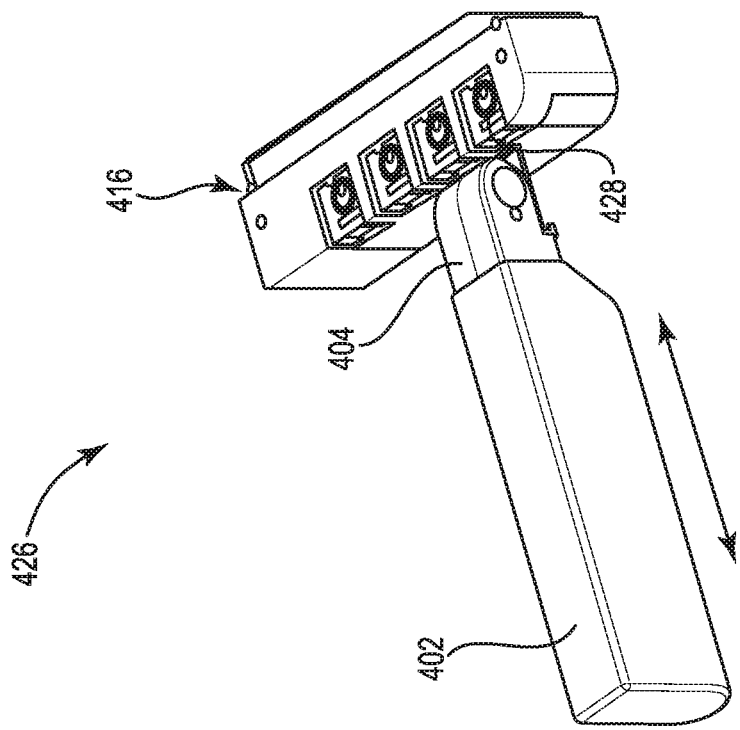
FIG. 4 illustrates an example of a print substance supply including a rotary valve in a closed position and an imaging device consistent with the disclosure.

FIG. 4 illustrates an example of a print substance supply 426 including a rotary valve 404 in a closed position and an imaging device 416 consistent with the disclosure. Print substance supply 426 can include supply reservoir 402 and rotary valve 404. Also illustrated in FIG. 4 is imaging device 416. Imaging device 416 can include cleaning pad 428.

As illustrated in FIG. 4, rotary valve 404 is not connected to imaging device 416. As illustrated in FIG. 4, rotary valve 404 can be attached to and/or disconnected from imaging device 416 by the translational movement indicated in FIG. 4.

Imaging device 416 can include cleaning pad 428. As used herein, the term "cleaning pad" refers to a device to clean print substance from rotary valve 404. For example, during the translational movement indicated in FIG. 4 by supply reservoir 402/rotary valve 404, rotary valve 404 can brush over cleaning pad 428. As a result, print substance that may be located on the interface between rotary valve 404 and imaging device 416 may be cleaned off by cleaning pad 428. Cleaning pad 428 can be of a cloth, paper, fiber, plastic, and/or any other material to clean the interface between rotary valve 404 and imaging device 416 during the translational movement indicated in FIG. 4.

FIG. 5A illustrates an example of a print substance supply 530 including a rotary valve in a closed position and a supply reservoir 502 in a first orientation consistent with the disclosure. Supply reservoir 502 can include level indicators 532.

As illustrated in FIG. 5A, supply reservoir 502 can include level indicators 532. As used herein, the term "level indicator" refers to a marking to indicate an amount of print substance in supply reservoir 502. For example, level indicators 532 can indicate to a user an amount of print substance in supply reservoir 502.

For instance, supply reservoir 502 may be able to include one liter of print substance. The level indicators can indicate 0.25 liters, 0.5 liters, 0.75 liters, and/or 1 liter. The user may then know how much print substance can be supplied from supply reservoir 502 to a reservoir of an imaging device.

Although supply reservoir 502 is described above as including one liter of print substance with level indicators at 0.25 liters, 0.5 liters, 0.75 liters, and/or 1 liter, examples of the disclosure are not so limited. For example, supply reservoir may include one liter of print substance with level indicators at one third of one liter, two thirds of one liter, and one full liter. In some examples, supply reservoir 502 may include more than one liter of print substance or less than one liter of print substance, and can include level indicators at any other increments to indicate an amount of print substance in supply reservoir 502.

As illustrated in FIG. 5A, level indicators 532 can indicate an amount of print substance in supply reservoir 502 when the rotary valve is in a closed position and the supply reservoir 502 is in a first orientation. For example, the supply reservoir 502 may be oriented vertically, as illustrated in FIG. 5A. For instance, supply reservoir 502 may be stored in a vertical orientation. Level indicators 532 can indicate an amount of print substance in supply reservoir 502 when supply reservoir 502 is in a vertical orientation.

FIG. 5B illustrates an example of a print substance supply 534 including a rotary valve in a closed position and a supply reservoir 502 in a second orientation consistent with the disclosure. Supply reservoir 502 can include level indicators 536.

As illustrated in FIG. 5B, supply reservoir 502 can include level indicators 536. For example, level indicators 536 can indicate to a user an amount of print substance in supply reservoir 502.

As illustrated in FIG. 5B, level indicators 536 can indicate an amount of print substance in supply reservoir 502 when the rotary valve is in a closed position and the supply reservoir 502 is in a second orientation (e.g., an orientation that is different from the orientation illustrated in FIG. 5A). For example, the supply reservoir 502 may be oriented horizontally, as illustrated in FIG. 5B. For instance, supply reservoir 502 may be stored in a horizontal orientation. Level indicators 536 can indicate an amount of print substance in supply reservoir 502 when supply reservoir 502 is in a horizontal orientation.

FIG. 5C illustrates an example of a print substance supply 538 including a rotary valve in an open position consistent with the disclosure. Supply reservoir 502 can include level indicators 540.

As illustrated in FIG. 5C, supply reservoir 502 can include level indicators 540. For example, level indicators 540 can indicate to a user an amount of print substance in supply reservoir 502.

As illustrated in FIG. 5C, level indicators 540 can indicate an amount of print substance in supply reservoir 502 when the rotary valve is in an open position. For example, the rotary valve may be in an open position and attached to an imaging device (e.g., not shown in FIG. 5C) such that supply reservoir 502 is supplying print substance to the imaging device. Level indicators 540 can indicate an amount of print substance in supply reservoir 502 as supply reservoir 502 is supplying print substance to the imaging device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. An apparatus, comprising:
a supply reservoir including print substance; and
a rotary valve having a central rotary axis, wherein the central rotary axis is perpendicular to a height of the supply reservoir;
wherein:
when the supply reservoir is in a first orientation and the rotary valve is attached to the apparatus, the rotary valve is in a closed position such that the print substance is unable to be supplied from the supply reservoir; and
when the supply reservoir is rotated from the first orientation to a second orientation, the rotary valve is rotated from the closed position to an open position while attached to the apparatus, wherein the entirety of the supply reservoir is located above the rotary valve in the second orientation such that print substance is suppled from the supply reservoir through the rotary valve.

2. The apparatus of claim 1, wherein the supply reservoir includes a plurality of level indicators.

3. The apparatus of claim 2, wherein the plurality of level indicators includes:
a first level indicator to determine an amount of print substance in the supply reservoir when the rotary valve is in a closed position and the supply reservoir is in a first orientation; and
a second level indicator to determine an amount of print substance in the supply reservoir when the rotary valve is in a closed position and the supply reservoir is in a second orientation.

4. The apparatus of claim 2, wherein the plurality of level indicators includes a third level indicator to determine an amount of print substance in the supply reservoir when the rotary valve is in an open position.

5. The apparatus of claim 1, wherein the rotary valve is normally in the closed position.

6. The apparatus of claim 1, wherein the rotary valve includes an elastomeric seal such that a fluid tight seal is provided in the rotary valve.

7. A print substance supply, comprising:
a supply reservoir including print substance; and
a rotary valve having a central rotary axis, wherein:
the central rotary axis is perpendicular to a height of the supply reservoir; and
the rotary valve is in a closed position when the supply reservoir is in a first orientation and the rotary valve is attached to an imaging device such that the print substance is unable to be supplied from the supply reservoir;
wherein when the supply reservoir is rotated from the first orientation to a second orientation, the rotary valve is rotated from the closed position to an open position while attached to the imaging device, wherein the entirety of the supply reservoir is located above the rotary valve in the second orientation such that print substance is supplied from the supply reservoir, through the rotary valve, to a reservoir of the imaging device.

8. The print substance supply of claim 7, wherein the print substance supply includes a first locking mechanism that is normally engaged to prevent the rotary valve from being rotated from the closed position to the open position.

9. The print substance supply of claim 8, wherein the first locking mechanism is adapted to be disengaged in response to the rotary valve being attached to the imaging device to allow the rotary valve to be rotated from the closed position to the open position.

10. The print substance supply of claim 7, wherein the print substance supply includes a second locking mechanism that is adapted to be engaged to a surface of the imaging device in response to the rotary valve being rotated from the closed position to the open position to prevent translational movement of the rotary valve when the rotary valve is in the open position.

11. The print substance supply of claim 7, wherein a direct path is provided from the supply reservoir, through the rotary valve, to the reservoir of the imaging device in response to the rotary valve being rotated from the closed position to the open position.

12. A system, comprising:
a print substance supply, including:
a supply reservoir including print substance; and
a rotary valve having a central rotary axis, wherein:
the central rotary axis is perpendicular to a height of the supply reservoir; and
the rotary valve is in a closed position when the supply reservoir is in a first orientation and the rotary valve is attached to an imaging device such that the print substance is unable to be supplied from the supply reservoir; and
the imaging device including a reservoir;
wherein when the supply reservoir is rotated from the first orientation to a second orientation, the rotary valve is rotated from the closed position to an open position while the rotary valve is connected to the imaging device, wherein the entirety of the supply reservoir is located above the rotary valve in the second orientation such that the print substance is supplied from the supply reservoir, through the rotary valve, to the reservoir of the imaging device.

13. The system of claim 12, wherein the imaging device further includes a cleaning pad adapted to clean the rotary valve when the rotary valve is attached to the imaging device.

14. The system of claim 12, wherein the print substance is adapted to be supplied to the reservoir of the imaging device from the print substance supply until an amount of print substance in the reservoir of the imaging device reaches a predetermined level.

15. The system of claim 14, wherein the rotary valve is adapted to be rotated from the open position to the closed position in response to the amount of print substance in the reservoir reaching the predetermined level.

* * * * *